(12) United States Patent
Andrews et al.

(10) Patent No.: US 10,320,199 B2
(45) Date of Patent: Jun. 11, 2019

(54) CONFIGURABLE LOW VOLTAGE POWER DISTRIBUTION CIRCUIT MODULES

(71) Applicants: James Christopher Andrews, Mableton, GA (US); Liang Fang, Peachtree City, GA (US); William Lee Shiley, Peachtree City, GA (US); James Moan, Fayetteville, GA (US)

(72) Inventors: James Christopher Andrews, Mableton, GA (US); Liang Fang, Peachtree City, GA (US); William Lee Shiley, Peachtree City, GA (US); James Moan, Fayetteville, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 414 days.

(21) Appl. No.: 15/097,822

(22) Filed: Apr. 13, 2016

(65) Prior Publication Data

US 2016/0308374 A1    Oct. 20, 2016

Related U.S. Application Data

(60) Provisional application No. 62/147,195, filed on Apr. 14, 2015.

(51) Int. Cl.
| | | |
|---|---|---|
| *H02J 11/00* | (2006.01) |
| *H02J 3/02* | (2006.01) |
| *H02J 5/00* | (2016.01) |
| *H02M 7/06* | (2006.01) |
| *H02M 7/46* | (2006.01) |
| *H02J 4/00* | (2006.01) |
| *H02G 3/00* | (2006.01) |

(52) U.S. Cl.
CPC ............... *H02J 5/00* (2013.01); *H02J 4/00* (2013.01); *H02M 7/06* (2013.01); *H02M 7/46* (2013.01); *H02G 3/00* (2013.01)

(58) Field of Classification Search
USPC ............................................. 307/18
See application file for complete search history.

(56) References Cited

U.S. PATENT DOCUMENTS

| | | | |
|---|---|---|---|
| 2010/0231041 A1* | 9/2010 | Koehler | H02J 1/00 307/31 |
| 2011/0062888 A1 | 3/2011 | Bondy et al. | |

FOREIGN PATENT DOCUMENTS

| | | | |
|---|---|---|---|
| GB | 2071438 | | 9/1981 |
| WO | WO 2011/079912 | | 7/2011 |
| WO | WO2011/079912 | * | 7/2011 |

OTHER PUBLICATIONS

International Search Report for PCT Patent Application No. PCT/US2016/027290 dated Aug. 11, 2016.

* cited by examiner

*Primary Examiner* — Hal Kaplan
*Assistant Examiner* — Xuan Ly
(74) *Attorney, Agent, or Firm* — King & Spalding LLP

(57) ABSTRACT

A power distribution module for a distributed low voltage power system can include at least one input channel configured to receive line voltage power from at least one power source. The power distribution module can also include at least one receiving feature electrically coupled to the at least one input channel, where the at least one receiving feature is configured to receive at least one replaceable circuit module. The power distribution module can further include at least one output channel electrically coupled to the at least one receiving feature, where the at least one output channel is configured to send a final low voltage (LV) signal to at least one LV device.

20 Claims, 5 Drawing Sheets

CONFIGURABLE LOW VOLTAGE POWER DISTRIBUTION CIRCUIT MODULES

RELATED APPLICATIONS

The present application claims priority under 35 U.S.C. § 119(e) to U.S. Provisional Patent Application No. 62/147,195, filed on Apr. 14, 2015, and titled "Configurable Low Voltage Power Distribution Circuit Modules." The entire content of the foregoing application is hereby incorporated herein by reference.

TECHNICAL FIELD

Embodiments described herein relate generally to low voltage power distribution systems, and more particularly to systems, methods, and devices for low voltage power distribution circuit modules that are configurable.

BACKGROUND

Certain devices within distributed power systems can operate on different types (e.g., direct current (DC), alternating current (AC)) and/or amounts (e.g., 24V, 2 A, 120V, 50 mA) of power relative to the type and amount of power that feeds the distributed power system. Further, the devices receiving power from the device distributing the power within the distributed power system can be located relatively close. In some cases, distributed low voltage power systems use one or more power distribution circuit modules.

SUMMARY

In general, in one aspect, the disclosure relates to a power distribution module for a distributed low voltage power system. The power distribution module can include at least one input channel configured to receive line voltage power from at least one power source. The power distribution module can also include at least one receiving feature electrically coupled to the at least one input channel, where the at least one receiving feature is configured to receive at least one replaceable circuit module. The power distribution module can further include at least one output channel electrically coupled to the at least one receiving feature, where the at least one output channel is configured to send a final low voltage (LV) signal to at least one LV device.

In another aspect, the disclosure can generally relate to a distributed low voltage power system. The system can include a power source generating line voltage power, and a power distribution module (PDM) coupled to the a power source. The PDM can include an power transfer circuit that generates a raw low voltage (LV) signal based on the line voltage power. The PDM can also include a first receiving feature having a first end and a second end, where the first end is electrically coupled to the power transfer circuit. The PDM can further include a first replaceable circuit module electrically coupled to and disposed within the first receiving feature, where the first replaceable circuit module comprises a first input portion coupled to the first end of the first receiving feature and a first output portion coupled to the second end of the first receiving feature, where the first replaceable circuit module generates a first final LV signal based on the raw LV signal. The system can further include at least one first LV device electrically coupled to the second end of the first receiving feature of the PDM, where the at least one first LV device operates using the first final LV signal.

In yet another aspect, the disclosure can generally relate to a distributed low voltage power system. The system can include a power source generating line voltage power, and a power distribution module (PDM) coupled to the power source. The PDM can include a first receiving feature having a first end and a second end, where the first end is electrically coupled to the power source. The PDM can also include a first replaceable circuit module electrically coupled to and disposed within the first receiving feature, where the first replaceable circuit module includes a first input portion coupled to the first end of the first receiving feature and a first output portion coupled to the second end of the first receiving feature, where the first replaceable circuit module generates a raw low-voltage (LV) signal based on the line voltage power. The PDM can further include a first power conversion circuit electrically coupled to the second end of the first receiving feature, where the first power conversion circuit generates a first final LV signal based on the raw LV signal. The system can also include at least one first LV device electrically coupled to the first power conversion circuit of the PDM, where the at least one first LV device operates using the first final LV signal.

These and other aspects, objects, features, and embodiments will be apparent from the following description and the appended claims.

BRIEF DESCRIPTION OF THE DRAWINGS

The drawings illustrate only example embodiments of configurable low voltage power distribution circuit modules and are therefore not to be considered limiting of its scope, as configurable low voltage power distribution circuit modules may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
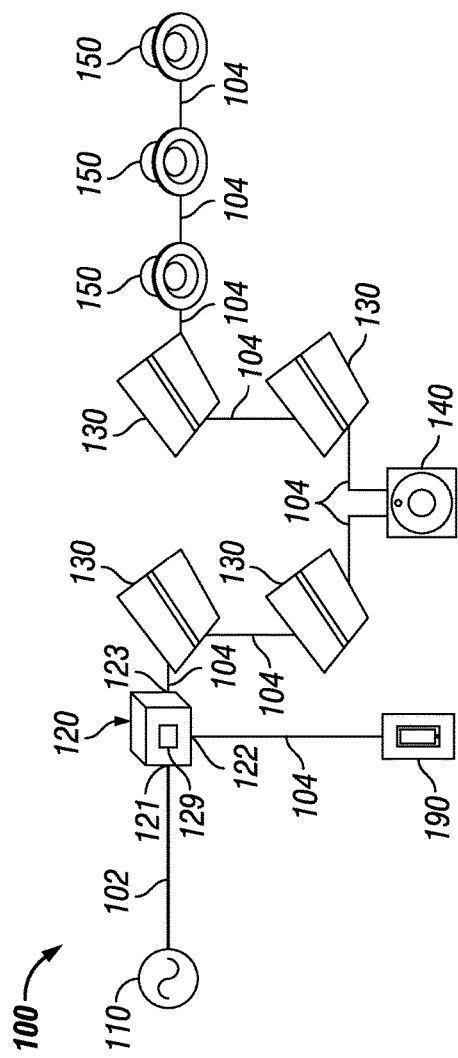
FIG. 1 shows a system diagram of a distributed low voltage power system in accordance with certain example embodiments.

The example embodiments discussed herein are directed to systems, apparatuses, and methods of configurable low voltage power distribution circuit modules. While example embodiments described herein are directed to use with lighting systems, example embodiments can also be used in systems having other types of devices. Examples of such other systems can include, but are not limited to, security systems, fire protection systems, emergency management systems, and assembly systems. Thus, example embodiments are not limited to use with lighting systems.

Further, while example power distribution circuit modules can be described as low voltage, some circuit modules can be configured to receive higher voltages (e.g., 120 VAC). As described herein example removable circuit modules can include a power distribution module (PDM) that has one or more receiving features (described below) for receiving the removable circuit modules.

As described herein, a user can be any person that interacts with example configurable low voltage power distribution circuit modules. Examples of a user may include, but are not limited to, a consumer, an electrician, an engineer, a mechanic, a pipe fitter, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In certain example embodiments, the PDMs and the configurable low voltage power distribution circuit modules (or portions thereof) described herein meet one or more of a number of standards, codes, regulations, and/or other requirements established and maintained by one or more entities. Examples of such entities include, but are not limited to, Underwriters' Laboratories, the Institute of Electrical and Electronics Engineers, and the National Fire Protection Association. For example, wiring (the wire itself and/or the installation of such wire) that electrically couples an example PDM (defined below) with a device may fall within one or more standards set forth in the National Electric Code (NEC). Specifically, the NEC defines Class 1 circuits and Class 2 circuits under various Articles, depending on the application of use.

Class 1 circuits under the NEC typically operate using line voltages (e.g., between 120 VAC and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VAC, no more than 60 VDC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits can be installed by someone other than a licensed electrical professional.

As another example, the International Electrotechnical Commission (IEC) sets and maintains multiple standards and categorizations of electrical supply for a system. One such categorization is separated or safety extra-low voltage (SELV), which is an electrical system in which the voltage cannot exceed 25 V AC RMS (root-mean-square) (35 V AC peak) or 60 V DC under dry, normal conditions, and under single-fault conditions, including earth faults in other circuits. Another such categorization is protected extra-low voltage (PELV) is an electrical system in which the voltage cannot exceed 25 V AC RMS (35 V AC peak) or 60 V DC under dry, normal conditions, and under single-fault conditions, except earth faults in other circuits. Yet another such categorization is functional extra-low voltage (FELV) is an electrical system in which the voltage cannot exceed 25 V AC RMS (35 V AC peak) or 60 V DC under normal conditions.

Example embodiments of configurable low voltage power distribution circuit modules will be described more fully hereinafter with reference to the accompanying drawings, in which example embodiments of configurable low voltage power distribution circuit modules are shown. Configurable low voltage power distribution circuit modules may, however, be embodied in many different forms and should not be construed as limited to the example embodiments set forth herein. Rather, these example embodiments are provided so that this disclosure will be thorough and complete, and will fully convey the scope of configurable low voltage power distribution circuit modules to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of configurable low voltage power distribution circuit modules. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a distributed low voltage power (DLVP) system 100 in accordance with certain example embodiments. The system 100 of FIG. 1 includes a power source 110, a power distribution module 120 (also called a PDM 120), a number (in this case, four) of troffer lights 130, a number (in this case, three) of can lights 150, a number (in this case, one) of sensing devices 140, and a number (in this case, one) of controllers 190. The power source 110 and the PDM 120 can be electrically coupled to each other by a line voltage cable 102, while the remaining components of the system 100 are coupled to each other by a number of LV cables 104. Operational components 108 of the system 100 (or any system described herein), such as the troffer lights 130, the can lights 150, and the sensing devices 140, can be referred to generally as LV devices 108.

The sensing device 140 can be any device that detects one or more conditions. Examples of a sensing device 140 can include, but are not limited to, a photocell, a motion detector, an audio detector, a pressure detector, a temperature sensor, and an air flow sensor. The controller 190 can be any device that controls one or more of the other devices in the system 100. Examples of a controller 190 can include, but are not limited to, a thermostat, a dimmer switch, a control switch, a control panel, and a power switch.

The power source 110 generates and/or delivers, indirectly, electrical power that is a higher voltage than the voltage ultimately used by the various low-voltage (LV) devices (e.g., troffer lights 130, can lights 150, sensing device 140) in the system 100. The power generated or delivered by the power source 110 can be called line voltage power. The line voltage power is a power that is typically delivered to a house, building, or other similar structure that supplies electricity located within or proximate to such structure. The power source 110 can also generate DC power. Examples of voltages generated by the power source 110 can include 120 VAC, 240 VAC, 277 VAC, and 480 VAC. If the line voltage power is AC power, the frequency can be 50 Hz, 60 Hz, or some other frequency. Examples of a power source 110 can include, but are not limited to, a battery, a solar panel, a wind turbine, a power capacitor, an energy storage device, a power transformer, a fuel cell, a generator, and a circuit panel. As defined herein, a line voltage includes any of a number of voltages that are at least as great as the maximum LV signal (described below), and that is typically a nominal service voltage such as 120 VAC or 480 VDC.

The line voltage power is sent directly from the power source 110 to the PDM 120 using the line voltage cable 102. The line voltage cable 102 can include one or more conductors made of one or more electrically conductive materials (e.g., copper, aluminum). The size (e.g., gauge) of the line voltage cable 102 (and/or conductors therein) are sufficient to carry the line voltage power of the power source 110 to the PDM 120. Each line voltage cable 102 may be coated with an insulator made of any suitable material (e.g., rubber, plastic) to keep the electrical conductors electrically isolated from any other conductor in the line voltage cable 102.

The LV devices 108 (e.g., the troffer lights 130, the can lights 150, the sensing device 140) are each electrically coupled, directly or indirectly, to the PDM 120. The PDM 120 is electrically coupled to the power source 110 using the line voltage cable 102. The PDM 120 can include a power transfer device that generates one or more of a number of LV signals for one or more of the LV devices 108 in the system 100. The PDM 120 can have an input portion (e.g., input channel 121), an output portion (e.g., output channel 122, output channel 123), and a power transfer device 129. As defined herein, a LV signal has a voltage that does not exceed approximately 42.4 VAC (root mean square) or 60 VDC.

The power transfer device 129 can include one or more of a number of components that alter the amount and/or a type of the LV power received on the LV cable 104. Such components can include, but are not limited to, a transformer (for raising or lowering a level of AC power), a rectifier (for generating DC power from AC power), and an inverter (for generating AC power from DC power). The power transfer device can include solid state components and/or discrete components (e.g., resistors, capacitors, diodes). Examples of a power transfer device in certain embodiments are shown below with respect to FIGS. 3A through 5.

In certain example embodiments, the input portion of the PDM 120 can include one or more input channels 121 that receive the line voltage power from the power source 110. The output portion of the PDM 120 can include one or more of a number (e.g., one, two, five, ten) of output channels (e.g., output channel 122, output channel 123), where each output channel (also called an outlet channel) of the output section delivers one or more LV signals for use by one or more LV devices 108 of the system 100 that are electrically coupled to that output channel of the output portion of the PDM 120.

The amount and/or type of power of the LV signal of one output channel can be substantially the same as, or different than, the amount and/or type of power of the LV signal of another output channel of the output portion of the PDM 120. For example, each output channel of the PDM 120 can output 100 W, 57 VDC of power (also called the LV signal or a final LV signal herein). As another example, each output channel of the PDM 120 can output 100 W, 48 VDC of power. The LV signals delivered by an output channel of the PDM 120 can be at a constant level and/or a variable level. The LV signals can change a state (e.g., on, off, dim, standby) of one or more devices. In addition, or in the alternative, the LV signal can send data (e.g., instructions, requests, information, status).

In certain example embodiments, one or more LV cables 104 are used to electrically couple, directly or indirectly, each of the LV devices 108 (e.g., the troffer lights 130, the can lights 150, the sensing device 140) in the system 100 to the PDM 120. The LV cables 104 can have one or more pairs of conductors. Each pair of conductors of the LV cable 104 can deliver LV signals that represent power signals and/or communication signals. In some cases, a LV cable 104 has at least one pair of conductors that carries power signals and at least one pair of conductors that carries control signals. The LV cables 104 can be plenum rated. For example, one or more of the LV cables 104 can be used in drop ceilings without conduit or cable trays.

The PDM 120 can also communicate, using an output channel (in this case, output channel 122) with one or more controllers 190 using a communication link 106. The communication link 106 can be a LV cable 104, Ethernet cable, or some other wired technology. In addition, or in the alternative, the communication link 106 can be a network using wireless technology (e.g., Wi-Fi, Zigbee, 6LoPan). The controller 190 can be communicably coupled to one or more other systems in addition to the PDM 120 of the system 100. Similarly, the PDM 120 can be coupled to one or more other PDMs in one or more other systems. The system 100 can have multiple PDMs 120, where each PDM 120 of the system 100 provides LV power and communicates (sends and receives data) with each other, a controller 190, and/or one or more LV devices 108.

The controller 190 can communicate with (e.g., send instructions to, receive data about one or more LV devices 108 from) the PDM 120. Instructions sent by the controller 190 to the PDM 120 can affect the operation of all devices coupled to one or more particular channels of the PDM 120, particular devices coupled to one or more particular channels of the PDM 120, or any combination thereof. Communication between the PDM 120, the controller 190, and the controllers in one or more devices of the system 100 can include the transfer (sending and/or receiving) of data. Communications between the PDM 120, the controller 190, and/or a LV device 108 (e.g., the troffer lights 130, the can lights 150, the sensing device 140) can be made through the LV cables 104 and/or the communication link 106, using wired and/or wireless technology.

Such data can include instructions, status reports, notifications, and/or any other type of information. Specific examples of data and/or instructions sent between the PDM 120, the controller 190, and/or a LV device 108 (e.g., the troffer lights 130, the can lights 150, the sensing device 140) can include, but are not limited to, a light level, a light fade rate, a demand response, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, an a device identifier.

Communications between the PDM 120, the controller 190, and/or a LV device 108 (e.g., the troffer lights 130, the can lights 150, the sensing device 140) can be based on one or more of a number of factors. For example, communications can be based on an algorithm or formula set forth in software and/or hardware within one or more components of the system 100. As another example, communications can be based on events associated with a LV device 108 or other component of the system. Such events can include, but are not limited to, light intensity, an emergency condition, demand response, passage of time, and a time sweep.

In certain example embodiments, the PDM 120 can include communication and diagnostic capabilities. Communications can be with the controller 190, one or more devices coupled to the PDM 120, other PDMs 120 in the system 100, a user device, and/or any other component of the system 100. Diagnostic capabilities can be for operations of the system 100 overall, for operations of the PDM 120, for operations of one or more LV devices 108 coupled to the PDM 120, for operations of one or more other PDMs in the system 100, and/or for any other components of the system 100.

The PDM 120 and/or the controller 190 can include a hardware processor-based component that executes software instructions using integrated circuits, discrete components, and/or other mechanical and/or electronic architecture. In addition, or in the alternative, the PDM 120 and/or the controller 190 can include one or more of a number of non-hardware-based components. An example of such a non-hardware-based components can include one or more field programmable gate arrays (FPGA). Using FPGAs and/or other similar devices known in the art allows the PDM 120 and/or the controller 190 to be programmable and function according to certain logic rules and thresholds without the use, or with limited use, of a hardware processor. The PDM 120 can also have one or more of a number of other hardware and/or software components, including but not limited to a storage repository, memory, an application interface, and a security module. Similarly, the controller 190 can include one or more software and/or hardware components, including but not limited to those listed above for the PDM 120.

In certain example embodiments, one or more of the LV devices 108 (in this case, the light troffers 130, the can lights 150, the sensing device 140) and the controller 190 in the system 100 receive LV signals from the PDM 120. The LV signals used by a particular LV device 108 can be power of the same amount and type as the LV signals sent by the PDM 120. Alternatively, a LV device 108 can use a LV signal of an amount and type that are different than the amount and/or type of power delivered by the PDM 120. In such a case, the LV device 108 can include a local power transfer device (not shown). A local power transfer device can be used to receive power from a LV cable 104 and to output the LV signal, which can be used by the associated LV device 108.

The local power transfer device can be substantially the same as the power transfer device 129 of the PDM 120 described above. In any case, the voltage signals received by the LV devices 108 (e.g., troffer lights 130, sensing devices 140) in the system 100 are classify the system 100 as a "safe" system under currently-existing standards and/or regulations. For example, such a system 100 is considered a NEC Class 2 system. As another example, such a system 100 is considered free from risk of fire and/or electrical shock.

The example LV devices 108 (e.g., the troffer lights 130, the can lights 150, the sensing device 140) listed above are not meant to be limiting. Examples of other LV devices 108 that can receive and use (directly or indirectly) LV signals from the PDM 120 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

Figure 2:
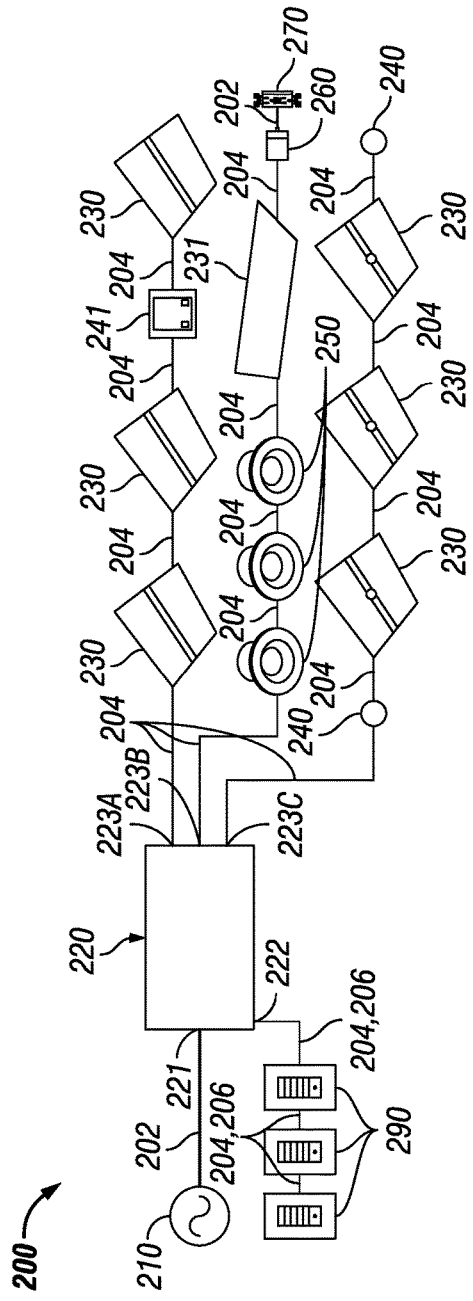
FIG. 2 shows a system diagram of another distributed low voltage power system in accordance with certain example embodiments.

FIG. 2 shows a system diagram of yet another DVLP system 200 in accordance with certain example embodiments. Referring to FIGS. 1 and 2, the system 200 has a PDM 220 that has three output channels (output channel 223A, output channel 223B, output channel 223C) that each provides LV signals through LV cables 204. Output channel 223A of the PDM 220 provides LV signals in series to two troffer lights 230, a photocell/timer 241, and another troffer light 230. Output channel 223B of the PDM 220 provides LV signals in series to three can lights 250, a different troffer light 231, and an inverter 260, which feeds AC power to a wall outlet 270 using a line voltage cable 202. Output channel 223C of the PDM 220 provides LV signals in series to a motion sensor 240, three light troffers 230, and another motion sensor 240.

Figure 3A:
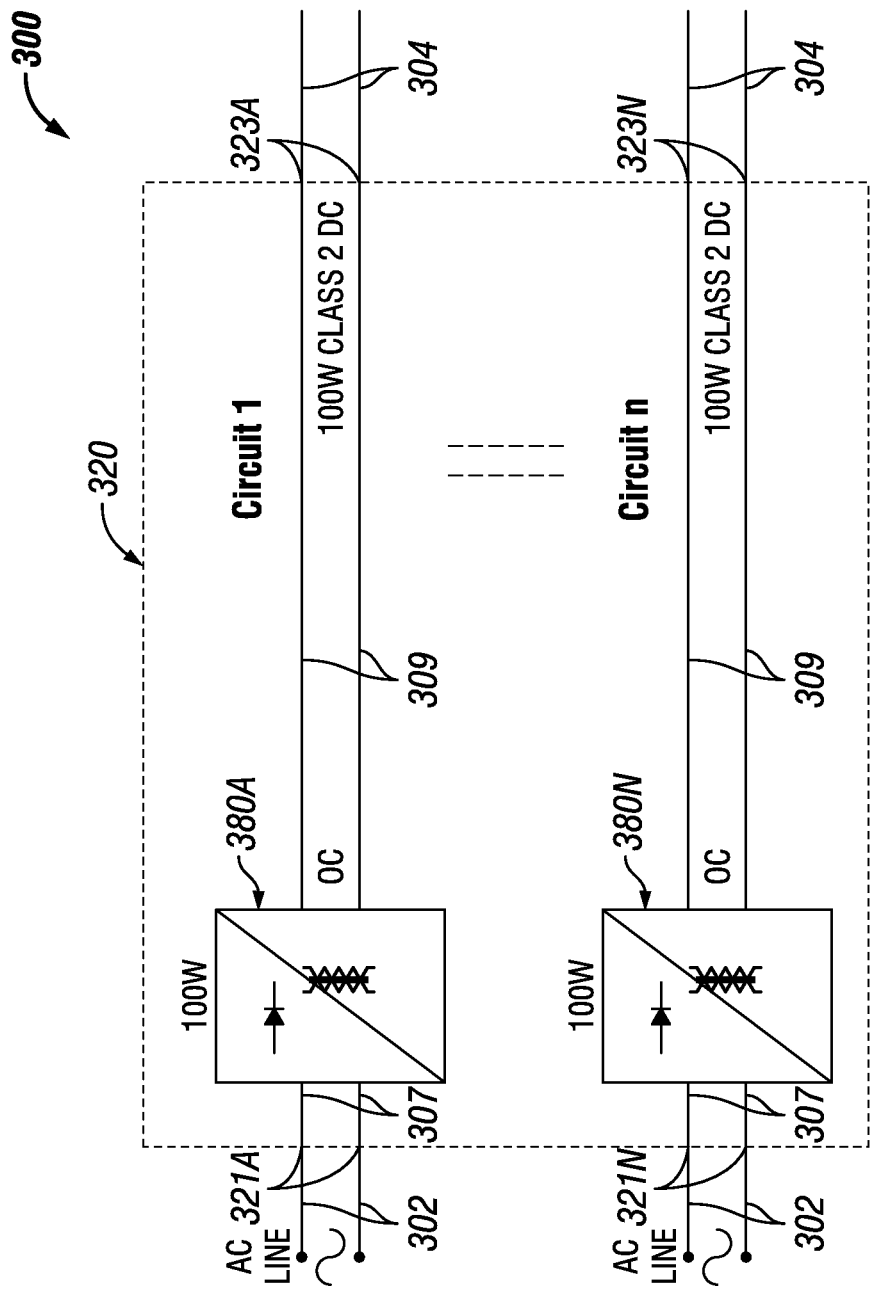
FIGS. 3A and 3B show diagrams of a low voltage power distribution module in accordance with certain example embodiments.
Figure 3B:
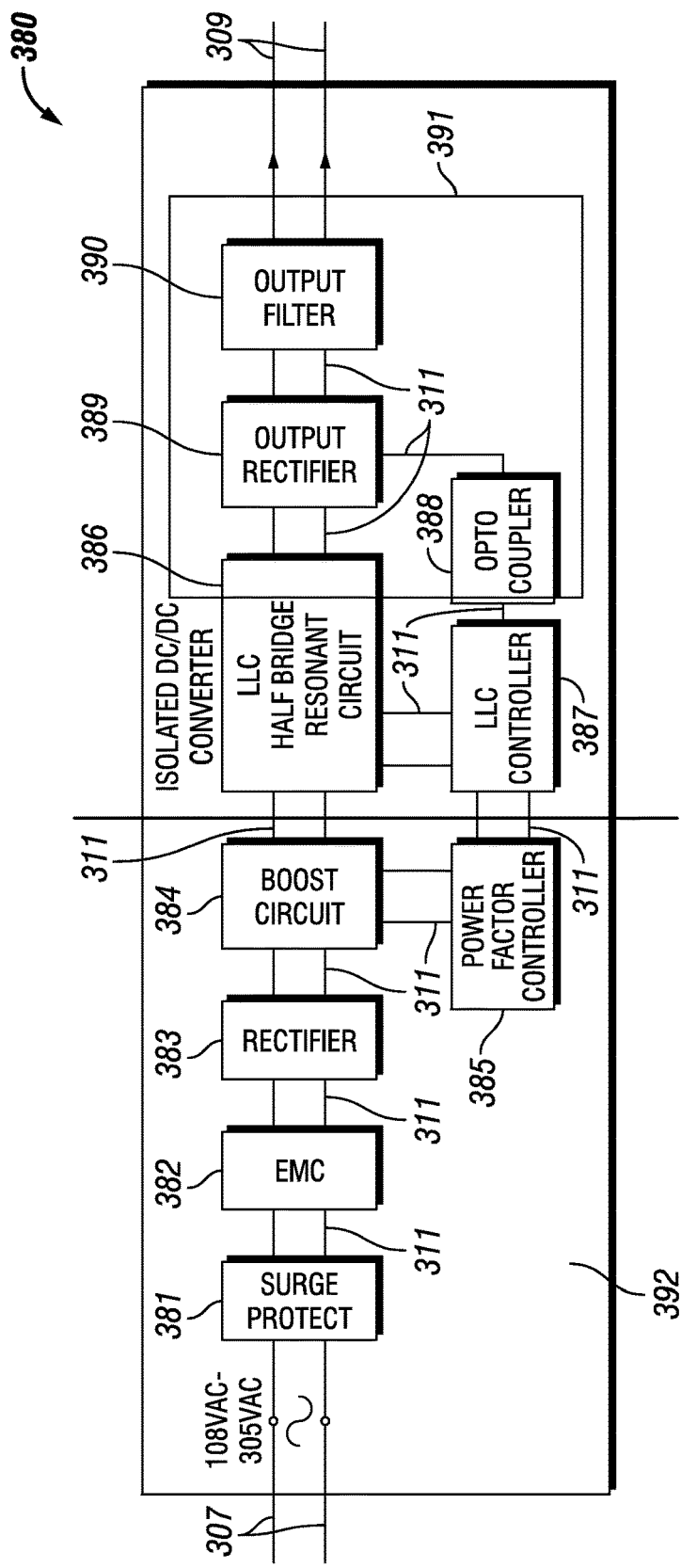

In the current art, a PDM is a unit that has no modularity. In other words, if a portion of the PDM fails, the entire PDM is replaced. Example embodiments are directed to PDMs that are, to some extent, modular. FIGS. 3A and 3B show example components of a DLVP system 300 that includes an example modular PDM 320. Specifically, FIG. 3A shows a block diagram of the DLVP system 300, which includes an example modular PDM 320 having a number of circuits 380 (also called DLVP AC-DC circuits). FIG. 3B shows an example of a circuit 380 within a PDM 320.

Referring to FIGS. 1-3B, the modular PDM 320 includes a number of circuits 380 (e.g., circuit 380A, circuit 380N). Each circuit 380 receives input power at an input channel 321 (e.g. input channel 321A, input channel 321N) using one or more line voltage cables 302. The input power is sent to a respective circuit 380 using internal conductor 307. That circuit 380 than processes the input power to generate a LV signal, which is sent along internal conductors 309 to an output terminal 323 (e.g., output terminal 323A, output terminal 323N). As discussed above, one or more LV cables 304 are connected to each output terminal 323 of the PDM 320.

The components of the circuit 380 can vary. For example, as shown in FIG. 3B, the circuit 380 can include a surge protector 381, an EMC 382, a rectifier 383, a boost circuit 384, a power factor controller 385, a converter 386, a controller 387, an optocoupler 388, a rectifier 389, and a filter 390. Each of these components can be electrically coupled to one or more other components of the circuit 380 using one or more internal conductors 311. As shown in FIGS. 3A and 3B, the circuits 380 are modular (substantially repetitive) in design and configuration.

The PDM 320 of FIGS. 3A and 3B can include a power transfer circuit 392 and a conversion circuit 391. The power transfer circuit 392, similar to the power transfer device 129 of FIG. 1, can receive line voltage power and generate raw LV signals using the line voltage power. The power transfer circuit 392 can include one or more of a number of components. In this case, the power transfer circuit 392 includes the surge protector 381, the EMC 382, the rectifier 383, the boost circuit 384, the power factor controller 385, the converter 386, and the controller 387.

The conversion circuit 391 receives raw LV signals and coverts the raw LV signals to final LV signals. In some cases, the raw LV signals and the final LV signals are DC. The conversion circuit 391 can include one or more of a number of components. In this case, the power transfer circuit 392 includes the optocoupler 388, the rectifier 389, and the filter 390.

Figure 4:
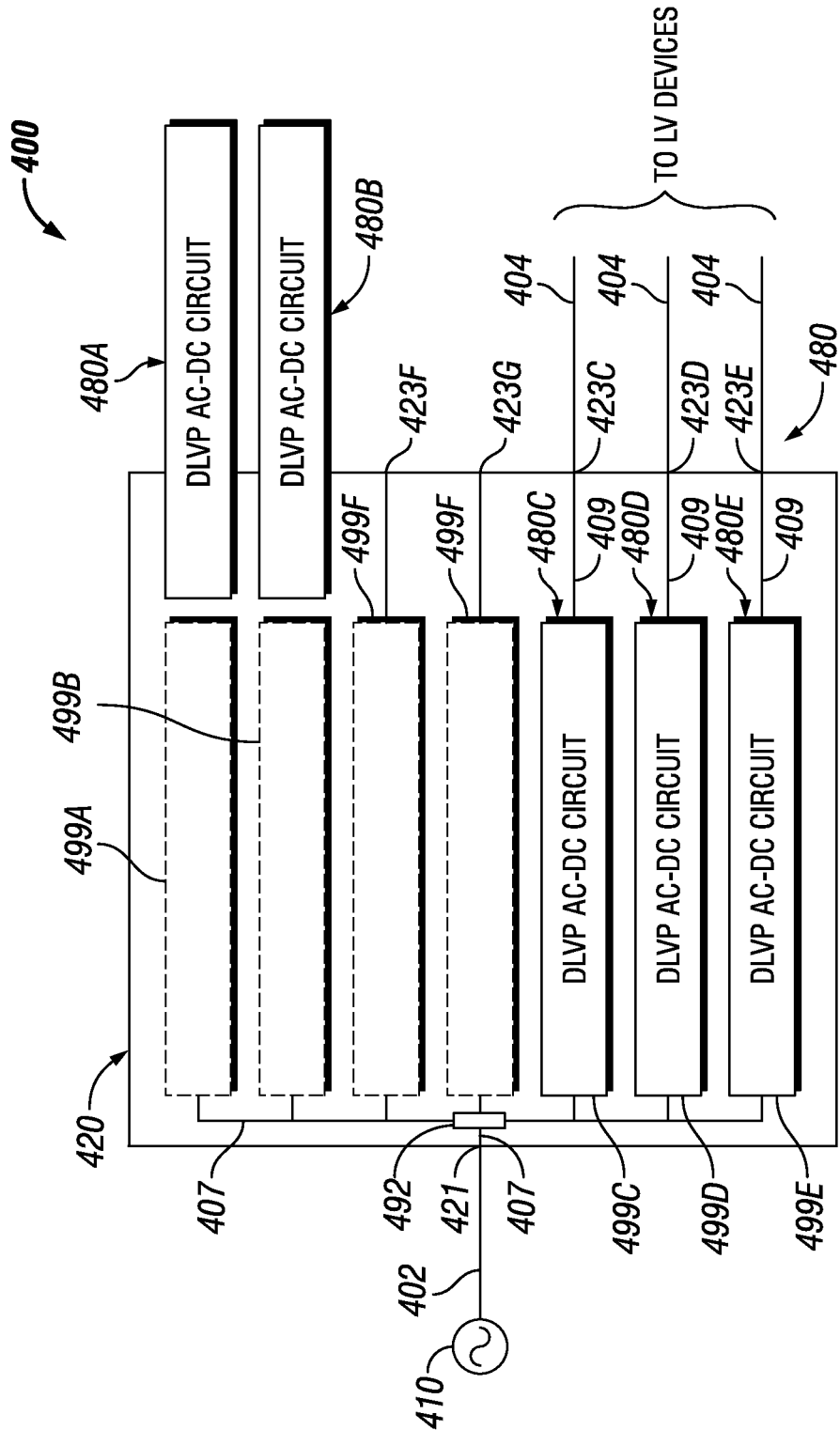
FIG. 4 shows a low voltage power distribution module in accordance with certain example embodiments.

As shown in FIG. 4, there can be multiple circuits 480 (in this example, circuit 480A, circuit 480B, circuit 480C, circuit 480D, and circuit 480E) of the PDM 420. The circuits 480 can be substantially the same as the circuit 380 shown in FIG. 3B above, where the raw LV signal is received and converted into the final LV signal (or, more simply, the LV signal herein). One circuit 480 can be substantially the same as and/or different than the other circuits 480 of the DLVP circuit 400 of FIG. 4. Of these circuits 480, one or more can be removable. A removable circuit 480 (also called a removable circuit module 480 or a circuit module 480) can be removably disposed within a receiving feature 499 of the PDM 420. In this case, the removable circuit 480 can be substantially the same as the conversion circuit 391 of FIGS. 3A and 3B discussed above.

There can be circuitry within the PDM 420 of FIG. 4 that is not removable. For example, in this case, the power transfer circuit 492 (similar to the power transfer circuit 392 of FIG. 3B above) is not disposed within a receiving feature and is not removable from the PDM 420. As shown in FIG. 4, there can be multiple receiving features 499 in the PDM 420. In such a case, the characteristics (e.g., shape, size, coupling features) of one receiving feature 499 can be substantially the same as and/or different than the corresponding characteristics of one or more other receiving features 499.

A receiving feature 499 can include one or more of a number of coupling features for coupling to a removable circuit module 480. Examples of such coupling features can include, but are not limited to, a clip, a snap fitting, a fastening device (e.g., a screw), a slot, a tab, and a detent. As an example, a removable circuit 480 can be electrically and mechanically coupled to and decoupled from the PDM 420 in a substantially similar way that a circuit breaker is coupled to and decoupled from a circuit breaker panel. The PDM 420 can have more than one receiving feature 498. The number of receiving features 498 can be at least as great as the number of removable circuits 480 that can be disposed within the receiving features 498.

In each case, a removable circuit 480, when properly disposed within a receiving feature 499, is electrically coupled to an internal conductor 407, which carries the line voltage delivered by the power source 410 to the input channel 421 of the PDM 420 using a line voltage cable 402. The internal conductor 407 acts like a bus that feeds each circuit 480 that is properly disposed within a receiving feature 499. In this case, each circuit 480 processes the line voltage to generate a Class 2 LV signal that is sent to an output channel 423 of the PDM 420 using one or more internal conductors 409.

In this case, receiving feature 499A corresponds to (is electrically coupled to) output channel 423A (hidden from view by removable circuit 491A). Receiving feature 499B corresponds to output channel 423B (hidden from view by removable circuit 491B). Receiving feature 499C corresponds to output channel 423C. Receiving feature 499D corresponds to output channel 423D. Receiving feature 499E corresponds to output channel 423E. Receiving feature 499F corresponds to output channel 423F. Receiving feature 499G corresponds to output channel 423G.

LV cables 404 are connected to the output channels 423 (in this case, output channel 423C, output channel 423D, and output channel 423E) to carry the LV signals to one or more LV devices (not shown in FIG. 4). In some cases, a removable circuit 480, rather than the corresponding receiving feature 498, can include an input channel 421 and/or an output channel 423.

In certain example embodiments, as shown in FIG. 4, not all of the receiving features 499 of a PDM 420 need to be used for the PDM 420 to operate. In other words, some receiving features 499 can be without a circuit module 480 disposed therein. This shows another way that the PDM 420 can be configurable. Specifically, in addition to various configurations of each circuit module 480, a circuit module 480 can be moved from one receiving feature 499 of a PDM 420 to another receiving feature 499. In addition, one or more receiving features 499 of a PDM 420 can be left open (unused) while the other receiving features 499 can have circuit modules 480 disposed therein.

Figure 5:
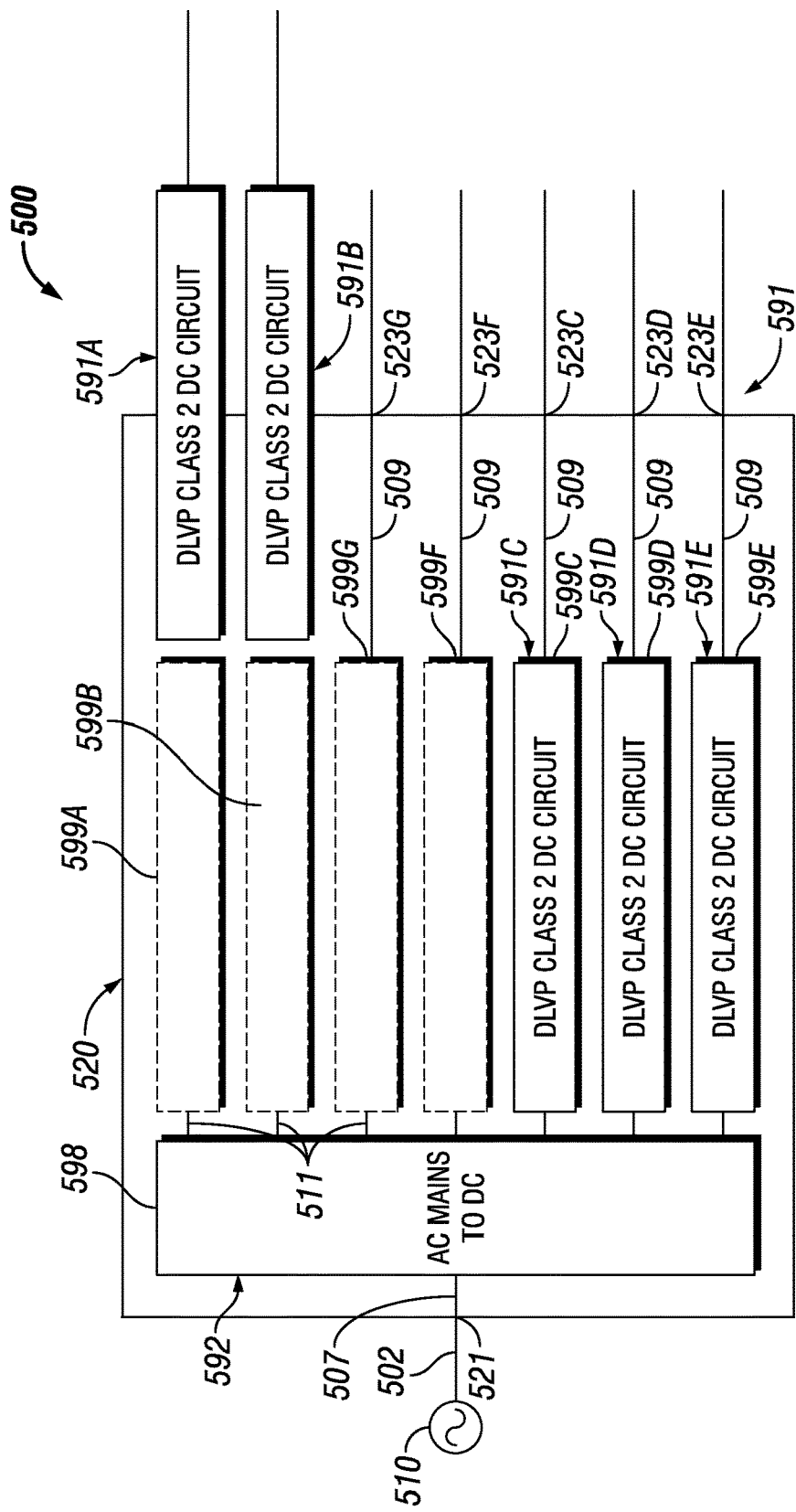
FIG. 5 shows another low voltage power distribution module in accordance with certain example embodiments.

In certain example embodiments, a PDM of a DLVP system can have tiers of removable circuits and receiving features. For example, FIG. 5 shows a DLVP system 500 having a PDM 520 with multiple types of removable circuits and receiving features. Specifically, the PDM 520 has one removable circuit 592, a receiving feature 598 that receives the removable circuit 592, a number (in this case, five) removable circuits 591 (in this case, removable circuit 591A, removable circuit 591B, removable circuit 591C, removable circuit 591D, and removable circuit 591E), and a number of receiving features 599 that can receive the removable circuits 591.

The PDM 520 can have more than one receiving feature 598. The number of receiving features 598 can be at least as great as the number of removable circuits 592 that can be disposed within the receiving features 598. Similarly, the PDM 520 can have more than one receiving feature 599. The number of receiving features 599 can be at least as great as the number of removable circuits 591 that can be disposed within the receiving features 599.

The removable circuit 592 of the DLVP system 500 of FIG. 5, when properly disposed within the receiving feature 598, can be coupled to the input channel 521 of the PDM 520 using internal conductor 507. In this way, the removable circuit 592 receives line voltage from the power source 510 through one or more line voltage cables 502. The removable circuit 592 can perform a function of the PDM 520 that is different than the functions performed by the removable circuits 591. For example, in this case, the removable circuit 592 can be a power transfer circuit that converts the line voltage from AC power to DC power (called a raw LV signal herein). In this way, the removable circuit 592 can be substantially similar to the power transfer circuit 392 of FIG. 3B and/or the power transfer device 129 of FIG. 1.

The removable circuit 592 can be coupled to one or more removable circuits 591 of the PDM 520 using one or more internal conductors 511. In some cases, the removable circuit 592, rather than the corresponding receiving feature 598, can include input channel 521. In certain example embodiments, there are multiple removable circuits 592 disposed in multiple receiving features 598, where each removable circuit 592 receives line voltage and generates a raw LV signal. In such a case, each removable circuit 592 feeds one or more of the removable circuits 591 disposed in one or more receiving features 599.

In some cases, the system 500 can include one or more power transfer circuits that are not removable, as in the case of FIG. 4 above. In other words, one or more of the removable circuits 592 and corresponding receiving features 598 of the system 500 are hardwired within the PDM 520. In addition, or in the alternative, some embodiments of the system 500 can include one or more power conversion circuits that are not removable. In other words, one or more of the removable circuits 591 and corresponding receiving features 599 of the system 500 are hardwired within the PDM 520.

Each removable circuit 591 of the PDM 520 of FIG. 5 receives the output (e.g., the raw LV signal) of the removable circuit 592 and creates its own output (e.g., the final LV signal), which is sent to an output channel 523 using one or more internal conductors 509. In other words, in this case, the removable circuit 591 can be substantially the same as the conversion circuit 391 of FIGS. 3A and 3B discussed above.

The configuration of one removable circuit 591 can be substantially the same as, or different than, the other removable circuits 591. The components of a removable circuit 591 can vary. For example, the components and configuration of each removable circuit 591 can correspond to the subset 391 of components shown in FIG. 3B. In such a case, each removable circuit 591 can be a power conversion circuit that converts the DC signal (e.g., the raw LV signal) generated by the removable circuit 592 to the final LV signal (which can also be a DC signal) used by the one or more LV devices coupled to the corresponding output channel 523. Both the raw LV signal generated by a removable circuit 591 and the final LV signal generated by a removable circuit 592 can be a Class 2 LV signal.

The final LV signal generated by a removable circuit 591 can be can be sent to an output channel 523 using one or more internal conductors 509. One or more LV devices (not shown) can receive the final LV signals using LV cables 504 coupled to the output channels 523. In some cases, a removable circuit 591, instead of the corresponding receiving feature 599, can include a corresponding output channel 523. In this case, receiving feature 599A corresponds to (is electrically coupled to) output channel 523A (hidden from view by removable circuit 591A). Receiving feature 599B corresponds to output channel 523B (hidden from view by removable circuit 591B). Receiving feature 599C corresponds to output channel 523C. Receiving feature 599D corresponds to output channel 523D. Receiving feature 599E corresponds to output channel 523E. Receiving feature 599F corresponds to output channel 523F. Receiving feature 599G corresponds to output channel 523G.

Example embodiments provide a number of benefits. Examples of such benefits include, but are not limited to, reduction in energy usage; more simplistic installation, replacement, modification, and maintenance of a DLVP system, particularly with respect to a PDM of the DLVP system; qualification as a Class 2 device and/or system; compliance with one or more applicable standards and/or regulations; less need for licensed electricians; reduced downtime of equipment; lower maintenance costs, avoidance of catastrophic failure; increased flexibility in system design and implementation; prognosis of equipment failure; improved maintenance planning; and reduced cost of labor and materials. Example embodiments can also be integrated (e.g., retrofitted) with existing systems.

Example embodiments are electrically safe. Example PDMs that include one or more modular, replaceable circuits can be free from risk (or a greatly reduced risk) of fire or electrical shock for any user installing, using, replacing, and/or maintaining any portion of example embodiments. For example, modular, replaceable circuits of a PDM can allow a user to maintain the device without fear of fire or electrical shock. While Class 2 systems and SELV/PELV/FELV are described above, example embodiments can comply with one or more of a number of similar standards and/or regulations throughout the world. Costs are also substantially reduced using example embodiments because only specific portions of a PDM that fail can be replaced rather than the entire PDM.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A power distribution module for a distributed low voltage power system, the power distribution module comprising:
   at least one input channel configured to receive line voltage power from at least one power source;
   at least one receiving feature electrically coupled to the at least one input channel, wherein the at least one receiving feature is configured to receive at least one replaceable circuit module, wherein the at least one replaceable circuit module comprises a power transfer circuit that is configured to generate, at least in part, a final low voltage (LV) signal from the line voltage power; and
   at least one output channel electrically coupled to the at least one receiving feature, wherein the at least one output channel is configured to send the final LV signal generated by the power transfer circuit of the at least one receiving feature to at least one LV device.

2. The power distribution module of claim 1, wherein the at least one receiving feature comprises at least one first receiving feature and at least one second receiving feature, wherein the at least one replaceable circuit module comprises at least one first replaceable circuit module that is received by the at least one first receiving feature, wherein the power transfer circuit of the at least one first replaceable circuit module comprises an alternating current (AC)-to-direct current (DC) circuit that converts the line voltage power to a raw LV signal.

3. The power distribution module of claim 2, wherein the AC-to-DC circuit is a Class 2 circuit.

4. The power distribution module of claim 2, wherein the at least one output channel comprises a multiple number of output channels, wherein the at least one receiving feature further comprises the multiple number of second receiving features, wherein each second receiving feature is configured to receive at least one second replaceable circuit module that converts the raw LV signal to the final LV signal.

5. The power distribution module of claim 4, wherein the at least one second replaceable circuit is a DC-to-DC circuit.

6. The power distribution module of claim 4, wherein the at least one second replaceable circuit is a Class 2 circuit.

7. The power distribution module of claim 2, wherein the at least one first receiving feature and the at least one second receiving feature are electrically coupled in series with each other between the at least one input channel and the at least one output channel.

8. The power distribution module of claim 1, further comprising:
an alternating current (AC)-to-direct current (DC) circuit disposed between the at least one input channel and the at least one receiving feature, wherein the AC-to-DC circuit converts the line voltage power to a raw LV signal.

9. The power distribution module of claim 8, wherein the power transfer circuit of the at least one replaceable circuit module converts the raw LV signal to the final LV signal.

10. The power distribution module of claim 1, further comprising:
a direct current (DC)-to-DC circuit disposed between the at least one output channel and the at least one receiving feature, wherein the DC-to-DC circuit converts a raw LV signal to the final LV signal.

11. The power distribution module of claim 10, wherein the power transfer circuit of the at least one replaceable circuit module converts the input power to the raw LV signal.

12. The power distribution module of claim 11, wherein the input power is alternating current (AC) power, and wherein the power transfer circuit of the at least one replaceable circuit comprises an AC-to-DC circuit.

13. A distributed low voltage power system, comprising:
a power source generating line voltage power;
a power distribution module (PDM) coupled to the power source, wherein the PDM comprises:
a first power transfer circuit that generates a raw low voltage (LV) signal based on the line voltage power;
a first receiving feature comprising a first end and a second end, wherein the first end is electrically coupled to the first power transfer circuit; and
a first replaceable circuit module electrically coupled to and disposed within the first receiving feature, wherein the first replaceable circuit module comprises a first input portion coupled to the first end of the first receiving feature and a first output portion coupled to the second end of the first receiving feature, wherein the first replaceable circuit module further comprises a second power transfer circuit that generates, at least in part, a first final LV signal based on the raw LV signal; and
at least one first LV device electrically coupled to the second end of the first receiving feature of the PDM, wherein the at least one first LV device operates using the first final LV signal.

14. The distributed low voltage power system of claim 13, wherein the first power transfer circuit is removably coupled to a second receiving feature of the PDM, wherein the second receiving feature comprises a third end and a fourth end, wherein the fourth end of the second receiving feature is electrically coupled to the first end of the first receiving feature.

15. The distributed low voltage power system of claim 13, wherein the PDM further comprises:
a second replaceable circuit module electrically coupled to and disposed within the first receiving feature, wherein the second replaceable circuit module comprises a second input portion coupled to the first end of the first receiving feature and a second output portion coupled to the second end of the first receiving feature, wherein the second replaceable circuit module generates the first final LV signal based on the raw LV signal.

16. The distributed low voltage power system of claim 13, wherein the PDM further comprises:
a second replaceable circuit module electrically coupled to and disposed within the first receiving feature, wherein the second replaceable circuit module comprises a second input portion coupled to the first end of the first receiving feature and a second output portion coupled to the second end of the first receiving feature, wherein the second replaceable circuit module generates a second final LV signal based on the raw LV signal, wherein the second final LV signal is used by at least one second LV device that replaces the at least one first LV device.

17. The distributed low voltage power system of claim 13, further comprising:
a second receiving feature of the PDM comprising a third end and a fourth end, wherein the third end is electrically coupled to the first power transfer circuit; and
a second replaceable circuit module of the PDM electrically coupled to and disposed within the second receiving feature, wherein the second replaceable circuit module comprises a second input portion coupled to the third end of the second receiving feature and a second output portion coupled to the fourth end of the second receiving feature, wherein the second replaceable circuit module generates a second final LV signal based on the raw LV signal; and
at least one second LV device electrically coupled to the fourth end of the second receiving feature of the PDM, wherein the at least one second LV device operates using the second final LV signal.

18. A distributed low voltage power system, comprising:
a power source generating line voltage power;
a power distribution module (PDM) coupled to the power source, wherein the PDM comprises:
a first receiving feature comprising a first end and a second end, wherein the first end is electrically coupled to the power source;
a first replaceable circuit module electrically coupled to and disposed within the first receiving feature, wherein the first replaceable circuit module comprises a first input portion coupled to the first end of the first receiving feature and a first output portion coupled to the second end of the first receiving feature, wherein the first replaceable circuit module further comprises a first power conversion circuit that generates, at least in part, a raw low-voltage (LV) signal based on the line voltage power; and
a second power conversion circuit electrically coupled to the second end of the first receiving feature, wherein the second power conversion circuit generates a first final LV signal based on the raw LV signal; and
at least one first LV device electrically coupled to the second power conversion circuit of the PDM, wherein the at least one first LV device operates using the first final LV signal.

19. The distributed low voltage power system of claim 18, further comprising:
- a third power conversion circuit of the PDM electrically coupled to the second end of the first receiving feature, wherein the third power conversion circuit generates a second final LV signal based on the raw LV signal; and
- at least one second LV device electrically coupled to the third power conversion circuit of the PDM, wherein the at least one second LV device operates using the second final LV signal.

20. The distributed low voltage power system of claim 18, wherein the second power conversion circuit is removably coupled to a second receiving feature of the PDM, wherein the second receiving feature comprises a third end and a fourth end, wherein the third end of the second receiving feature is electrically coupled to the second end of the first receiving feature, and wherein the fourth end of the second receiving feature is electrically coupled to the at least one first LV device.

* * * * *